Feb. 17, 1953          J. DE MARIO          2,628,624
LIPSTICK ASSEMBLY
Filed Dec. 1, 1950
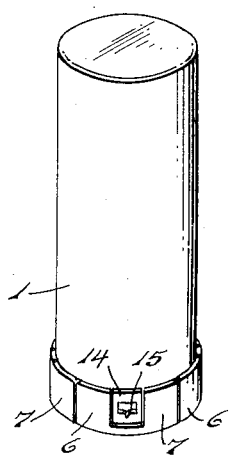
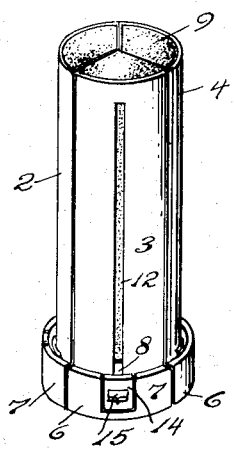
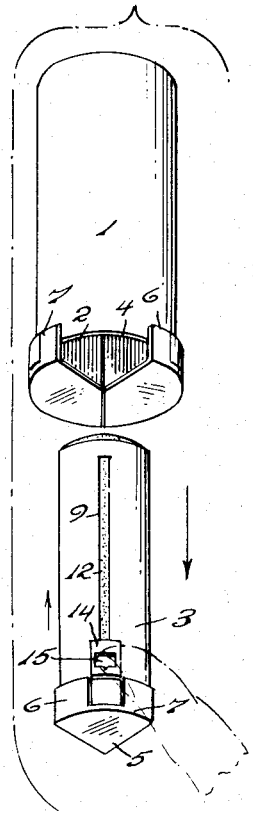
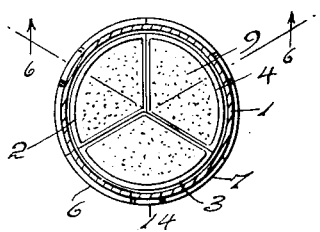
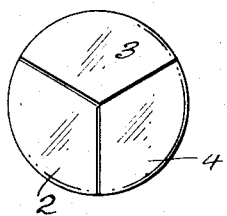
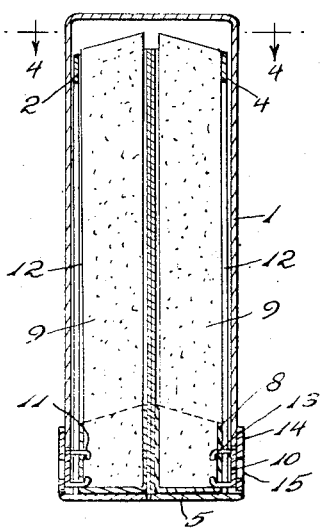
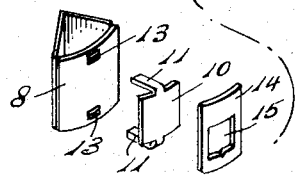
INVENTOR
Joseph De Mario
BY
Herbert P. Fairbanks
ATTORNEY Patented Feb. 17, 1953

2,628,624

UNITED STATES PATENT OFFICE 2,628,624

LIPSTICK ASSEMBLY

Joseph De Mario, Audubon, N. J.

Application December 1, 1950, Serial No. 198,646

2 Claims. (Cl. 132—79)

In my prior Patent No. 2,523,683 of September 26, 1950, I have described and broadly claimed a novel construction and arrangement of a multiple lip stick assembly wherein a plurality of lip stick containers were carried by a base, the individual containers being adapted to contain lip stick of different types or characteristics.

In my present invention, I employ a plurality of lip stick containers, sector shaped in cross section which are assembled within a casing and individually removable from the casing without disturbing containers remaining in the casing.

A further object of the invention is to provide novel means for closing the bottom of a container, said means also serving to secure the container within the casing.

A further object of the invention is to provide novel means for projecting and retracting the crayon holder in a container.

With the foregoing and other objects in view as will hereinafter clearly appear, my invention comprehends a novel lip stick assembly.

It further comprehends a novel construction of a container and novel means for frictionally locking it in a casing; and novel means for providing a pressure piece for the crayon holder.

For the purpose of illustrating the invention, I have shown in the accompanying drawings a preferred embodiment of it which I have found, in practice, to give satisfactory and reliable results. It is, however to be understood that the various instrumentalities of which the invention consists can be variously arranged and organized within the scope of the appended claims.

Figure 1 is a perspective view of a lip stick assembly, embodying my invention.

Figure 2 is a perspective view with the casing removed.

Figure 3 is a perspective view showing one container as having been removed from the casing and the other containers locked in the casing.

Figure 4 is a section on line 4—4 of Figure 6.

Figure 5 is a bottom plan view of the containers.

Figure 6 is a sectional elevation, line 6—6 Fig. 4.

Figure 7 is an exploded view of the crayon holder and pressure member.

Similar numerals of reference indicate corresponding parts.

Referring to the drawings:

I provide a casing 1 closed at its top and open at its bottom for insertion of containers 2, 3 and 4, each being of identical construction. Each container is sector shaped covering an angle of 120° to form a cylindrical unit when assembled. Each container is formed with an arcuate outer portion and converging sides and is open at its top. The bottom of the container is closed by a novel construction of a bottom 5 sector shaped and fixed to the walls of the container in any desired manner for example by solder. Integral with the bottom are spaced flanges 6 and 7 which extend at right angles to the bottom in an upward direction and spaced from the outer wall of the container. Slidable in each container is a crayon holder 8, sector shaped in cross section, and open at the top to receive a crayon 9, such as for example a lip stick.

A finger piece 10 has prongs 11 which pass through a slot 12 extending longitudinally in the arcuate wall of the container and are clipped through openings 13 in the holder. If desired, the face of the finger piece has a plate 14 fixed to it in any desired manner and provided with an opening 15.

When a container is moved into the casing, the lower open end of the casing rests on the finger piece and the locking flanges 6 and 7 frictionally engage the outer face of the casing to retain the container therein.

When all of the containers are within the casing, the flanges and finger pieces form a flush outer face of a sectional ring preferably of a uniform height.

In the operation, crayons such as for example lip stick of the desired types are inserted into the holders of the containers, and the containers are then inserted into the casing through its open end so that the casing rests on the top of the finger pieces, and the locking flanges 6 and 7 frictionally engage the outer face of the casing. It will thus be clear that each container has its own individual locking device and one container can be removed from the casing without affecting the locked condition of the other containers.

The manner in which the crayon or lip stick is propelled out of the casing and retracted within the casing will be clearly understood. The finger piece for convenience of manufacture is shown as consisting of two parts 10 and 14, but these parts may be made integral, if desired.

While I have shown three sectors of containers constituting a cylinder, two or more may be employed.

The user in accordance with this invention may have the choice of a plurality of shades of lip stick from a single assembly.

Having thus described my invention, what I claim as new and desire to secure by Letters Patent is:

1. A lip stick assembly comprising a casing having one end open and its opposite end closed, crayon containers sector shaped in cross section forming when assembled together a cylindrical unit in the casing, each container having a longitudinal slot, each container having a closed bottom with upwardly extending spaced curved flanges frictionally engaging the casing, crayon holders in the containers having finger pieces extending through the slots and received in the spaces between flanges of the bottom to form with the flanges a cylindrical wall around the inner end of the casing.

2. The construction defined in claim 1, wherein the bottom of the casing rests when the containers are assembled in the casing on the finger pieces.

JOSEPH DE MARIO.

REFERENCES CITED

The following references are of record in the file of this patent:

UNITED STATES PATENTS

| Number | Name | Date |
|---|---|---|
| 1,482,407 | Pennock | Feb. 5, 1924 |
| 1,890,068 | Scholl | Dec. 6, 1932 |